United States Patent [19]

Shigemoto

[11] Patent Number: 4,837,277
[45] Date of Patent: Jun. 6, 1989

[54] POLY(4-METHYL-1-PENTANE) COMPOSITION AND ARTICLES MOLDED THEREFROM

[75] Inventor: Hiromi Shigemoto, Iwakuni, Japan

[73] Assignee: Mitsui Petrochemical Industries, Ltd., Tokyo, Japan

[21] Appl. No.: 130,500

[22] Filed: Dec. 9, 1987

[30] Foreign Application Priority Data

Dec. 16, 1986 [JP] Japan .................................. 61-297497
Dec. 22, 1986 [JP] Japan .................................. 61-303879

[51] Int. Cl.$^4$ ...................... C08L 23/20; C08L 67/02; C08L 69/00; C08L 81/06
[52] U.S. Cl. .................................. 525/146; 525/150; 525/177; 525/184; 525/189; 525/240; 525/191
[58] Field of Search .............. 525/146, 177, 184, 189, 525/150, 240, 191

[56] References Cited

U.S. PATENT DOCUMENTS 4,548,991 10/1985 Feay ...................................... 525/146
4,649,176 3/1987 Hartsing, Jr. et al. .............. 525/146
4,704,432 11/1987 Feay ...................................... 525/146

FOREIGN PATENT DOCUMENTS 57-111351 7/1982 Japan .
58-34849 3/1983 Japan .
58-34850 3/1983 Japan .
60-20956 2/1985 Japan .

*Primary Examiner*—Allan M. Lieberman
*Attorney, Agent, or Firm*—Armstrong, Nikaido Marmelstein Kubovcik & Murray

[57] ABSTRACT

A resin composition comprising (A) 80 to 99.5% by weight of poly(4-methyl-1-pentene) and (B) 0.5 to 20% by weight of a thermoplastic resin having a reflective index between 1.48 and 1.80, typically polycarbonate and polyester has high resistance to food stains and a white color without a pigment and is suitable to mold into dishes.

13 Claims, No Drawings

POLY(4-METHYL-1-PENTANE) COMPOSITION AND ARTICLES MOLDED THEREFROM

BACKGROUND OF THE INVENTION

This invention relates to a poly(4-methyl-1-pentene) composition which is resistant to food stains and colored white without the need for a pigment. It also relates to white colored dishes having improved resistance to food stains.

The term "dish" is used herein in its broadest sense to designate all open containers for holding or serving food, including ordinary dishes, bowls, platters, cups, and other tableware used in serving food.

Most reusable dishes used in school lunch, cafeterias or the like are made of polypropylene because of its handling advantages of being lightweight, unbreakable, and durable. One consideration for reusable plastic dishes is the resistance to food stains that dishes having food adhered can be readily washed away of the food without being discolored. If dishes having curry, ketchup, barbecue or other sauces deposited for a long time can be readily cleaned up by washing, schools and other cafeterias which must deal with a great number of dishes can get an economic saving by reducing the time and labor consumed in washing. With the recent widespread use of microwave ovens, plastic dishes are now required to be microwave proof. Conventional polypropylene dishes have the drawbacks that they are not satisfactorily resistant to food stains and are too weakly heat resistant to be put in microwave ovens.

The lack of heat resistance can be overcome by the use of polycarbonate and polysulfone resins, which are still insufficient in resistance to food stains. Poly(4-methyl-1-pentene) has sufficient heat resistance and electrical properties to be used in microwave ovens and is resistant to food stains. Dishes molded from poly(4-methyl-1-pentene) are thus fully resistant to food stains and to cooking in microwave ovens.

Dishes, particularly on their surface, on which food is served, are often colored white for aesthetic and appetizing reasons. Since poly(4-methyl-1-pentene) is transparent as is well known in the art, the inventors attempted to impart a white color to dishes of poly(4-methyl-1-pentene). Various pigments are generally used to color resins white. The inventors blended a pigment or similar filler in poly(4-methyl-1pentene) to find that the filler adversely affects one of the features of poly(4-methyl-1-pentene), resistance to food stains.

SUMMARY OF THE INVENTION

It is, therefore, an object of the present invention to provide a novel and improved poly(4-methyl-1-pentene) composition which is resistant to food stains and colored white without a pigment.

Another object of the present invention is to provide a reusable plastic dish having improved resistance to food stains.

A further object of the present invention is to provide a plastic dish which is colored white without a pigment.

A still further object of the present invention is to provide a microwave oven-proof plastic dish.

According to the present invention, there is provided a poly(4-methyl-1-pentene) composition comprising:
(A) 80 to 99.5% by weight of poly(4-methyl-1-pentene) and
(B) 0.5 to 20% by weight of a thermoplastic resin having a refractive index between 1.48 and 1.80.

The thermoplastic resin is preferably selected from the group consisting of a polyester, a polycarbonate, a polyether sulfone, a polyamide, and a polyolefin other than the poly(4-methyl-1-pentene).

The present invention also provides a dish having improved resistance to food stains, wherein at least the surface portion to be in contact with food is formed of the resin composition defined above, whereby the dish has a white surface.

DETAILED DESCRIPTION OF THE INVENTION

The composition of the present invention has the two essential components, poly(4-methyl-1-pentene) (A) and thermoplastic resin (B).

The poly(4-methyl-1-pentene) (A) used herein may be a homopolymer of 4-methyl-1-pentene or a copolymer comprising a major proportion, usually at least 85 mol% of 4-methyl-1-pentene with another α-olefin, preferably an α-olefin having 2 to 20 carbon atoms, for example, such as ethylene, propylene, 1-butene, 1-hexene, 1-octene, 1-decene, 1-tetradecene, and 1-octadecene. The poly(4-methyl-1-pentene) (A) preferably has a melt flow rate of from 0.5 to 200 g/10 min. as measured under a load of 5 kg and at a temperature of 260° C. A polymer with a melt flow rate of less than 0.5 g/10 min. will have a melt viscosity which is too low to mold. A polymer with a melt flow rate of more than 200 g/10 min. will have a melt viscosity which is too low to mold as well as poor mechanical strength.

Component (B) is a thermoplastic resin having a refractive index of from 1.48 to 1.80. Any desired thermoplastic resin may be used as long as its refractive index ($n_D^{20}$) falls within this range. Preferred is a resin which has a refractive index of at least 1.50. In order that a composition of poly(4-methyl-1-pentene) (A) and thermoplastic resin (B) have a favorable profile of degree of whiteness and resistance to food stains, the thermoplastic resin is preferably selected from the group consisting of a polyester, a polycarbonate, a polyether sulfone, a polyamide, and a polyolefin other than the poly(4-methyl-1-pentene). The polyester and polycarbonate are most preferred.

The polyesters most preferably used as thermoplastic resin (B) are polyesters comprising (b-1) a dihydroxy compound unit selected from an aliphatic glycol (such as ethylene glycol, propylene glycol, 1,4-butanediol, neopentylglycol, and hexamethylene glycol), an alicyclic glycol (such as cyclohexane dimethanol), and an aromatic dihydroxy compound (such as a bisphenol), and a mixture thereof; and (b-2) a dicarboxylic acid unit selected from an aromatic dicarboxylic acid (such as terephthalic acid, isophthalic acid, and 2,6-naphthalene dicarboxylic acid), an aliphatic dicarboxylic acid (such as oxalic acid, succinic acid, adipic acid, sebacic acid, and undecadicarboxylic acid), an alicyclic dicarboxylic acid (such as hexahydroterephthalic acid), and a mixture thereof. These polyesters may be modified with small amounts of polyhydroxy compounds and polycarboxylic acids having a functionality of 3 or higher, for example, triols and tricarboxylic acids insofar as they remain thermoplastic. Typical examples of the thermoplastic polyester are polyethylene terephthalate and polybutylene terephthalate.

The polycarbonate most preferably used as thermoplastic resin (B) includes a variety of polycarbonate homopolymers and copolymers which may be prepared by reacting a dihydroxy compound with phosgene or a diphenyl carbonate by a well-known prior art method. Examples of the dihydroxy compound include hydroquinone, 4,4-dihydroxydiphenyl-methane, 4,4-dihydroxydiphenyl-ethane, 4,4-dihydroxydiphenyl-n-butane, 4,4-dihydroxydiphenyl-heptane, 4,4-dihydroxydiphenyl-phenyl-methane, 4,4-dihydroxydiphenyl-2,2-propane (bisphenol-A), 4,4-dihydroxy-3,3-dimethyldiphenyl-2,2-propane, 4,4-dihydroxy-3,3-diphenyl-diphenyl-2,2-propane, 4,4-dihydroxy-dichlorodiphenyl-2,2-propane, 4,4-dihydroxydiphenyl-1,1-cyclohexane, 4,4-dihydroxydiphenyl-methyl-phenyl-methane, 4,4-dihydroxydiphenyl-ethyl-phenyl-methane, 4,4-dihydroxydiphenyl-2,2,2-trichloro-1,1-ethane, 2,2-dihydroxydiphenyl, 2,6-dihydroxynaphthalene, 4,4-dihydroxydiphenyl ether, 4,4-dihydroxy-3,3-dichlorodiphenyl ether, and 4,4-dihydroxy-2,5-diethoxyphenyl ether. Preferred among them are polycarbonates derived from 4,4-dihydroxydiphenyl-2,2-propane (bisphenol-A). The polycarbonate may preferably have a flow rate of $1.5 \times 10^{-2}$ to $10 \times 10^{-2}$ ml/sec., more preferably from $4 \times 10^{-2}$ to $8 \times 10^{-2}$ ml/sec. as measured by the standard method of JIS K 6719.

The polyamides preferably used as thermoplastic resin (B) are, for example, aliphatic and aromatic polyamides such as nylon-6, nylon-66 and nylon-12. The preferred polyolefins are homopolymers and copolymers of an α-olefin such as ethylene, propylene and 1-butene, for example, polyethylene, polypropylene, poly(3-methyl-1-butene), and poly(1-butene).

The composition of the present invention is comprised of (A) 80 to 99.5% by weight, preferably 90 to 98% by weight of poly(4-methyl-1-pentene) and (B) 0.5 to 20% by weight, preferably 2 to 10% by weight of thermoplastic resin. A composition containing less than 0.5% by weight of thermoplastic resin (B) has a low degree of whiteness. When the content of thermoplastic resin (B) exceeds 20% by weight, the resulting composition is less resistant to food stains and sometimes loses microwave proofness.

Compositions comprising poly(4-methyl-1-pentene) and polycarbonate are known in the art, for example, in Japanese Patent Application Kokai No. 57-111351, 58-34849, 58-34850, and 60-20956. These compositions are, however, comprised of a major proportion of polycarbonate and a minor proportion of poly(4-methyl-1-pentene) blended therewith because they are formulated in order to modify polycarbonate, that is, to improve the lubricity and impact resistance of polycarbonate. These polycarbonate base compositions are less resistant to food stains because of a low content of poly(4-methyl-1-pentene), and cannot attain the object of the present invention.

The composition of the present invention may optionally contain any commonly used additive, for example, a thermal stabilizer, weathering stablilizer, antistatic agent, and lubricant insofar as the object of the present invention is not impaired.

The composition of the present invention may be prepared by blending poly(4-methyl-1-pentene), thermoplstic resin, and an optional additive such as a stabilizer in a ribbon blender, tumbling mixer, or Henschel mixer. The blend may be directly molded into various shapes. The blend may be further melt milled in an extruder, Banbury mixer or two-roll mill before molding. Alternatively, the polymers may be dissolved in a suitable solvent such as a hydrocarbon or aromatic solvent to form a polymeric solution. The molten mixture or the mixed solution may then be molded into various shapes by means of a suitable molding machine, for example, a single-screw extruder, vented extruder, twin-screw extruder, co-kneader, plasticator, mixtruder, twin conical screw extruder, planetary screw extruder, gear extruder, and screwless extruder.

Since the composition of the present invention is naturally colored white and is resistant to food stains, it is advantageously used for dishes including platters, bowls and other food serving containers.

A dish having improved resistance to food stains is obtained when at least a service surface of the dish to be in contact with food is formed of the resin composition of the present invention. As long as the service surface to be in contact with food is formed of a resin composition comprising components (A) and (B), the other surface may be formed of another resin composition. In this case, the dish has a two-layer or multilayer structure as a whole. Of course, the dish may be formed solely of a resin composition comprising components (A) and (B) according to the present invention.

The surface of a dish that is not to contact food may be formed of another resin composition as described above. The other resin composition may preferably comprise a major proportion of poly(4-methyl-1-pentene) to improve adhesion with a layer of the present resin composition. Since the surface that is not to contact food is most often an outside of the dish, the other resin composition may thus be colored with a pigment for aesthetic purposes. Various fillers may be blended in the other resin composition to improve heat resistance.

The dishes can be readily washed after use because at least a service surface to be in contact with food is highly resistant to food stains. Since the molding composition of the present invention inherently has a white color, the dishes have a white colored service serface which provides a good contrast to help food served thereon look attractive.

EXAMPLES

Examples of the present invention are given below by way of illustration and not by way of limitation.

EXAMPLE 1

A blend was prepared by mixing 95 parts by weight of poly(4-methyl-1-pentene), abbreviated as PMP, (trademark "TPX®RT18", manufactured and sold by Mitsui Petrochemical Industries, Ltd.) and 5 parts by weight of polycarbonate having a refractive index of 1.59, abbreviated as PC, (trademark "Panlite L-1250", manufactured and sold by Teijin Chemicals Co., Ltd.) in a 10-liter ribbon blender for 5 minutes. The blend was injection molded into rectangular plates of 12 cm by 13 cm by 2 mm (thickness) by means of an injection molding machine under a clamp pressure of 100 tons.

Five plates were stacked one on another. The plate stack was measured for L, a, and b values of the Hunter colorimetry using a digital differential colorimeter (model ND-504AA manufactured by Nihon Denshoku Co., Ltd.). A degree of whiteness was calculated according to the following equation.

$$\text{Degree of whiteness} = 100 - \sqrt{(100 - L)^2 + a^2 + b^2}$$

The haze and light transmittance of a single plate were measured according to ASTM D1003. The results are shown in Table 1.

Several vats were separately charged with ketchup, curry sauce, red pigmented ginger, cooked rice, miso soup, and Worcester sauce. Molded plates were placed in the vats, which were placed in an oven at 100° C. for 24 hours. The plates were then taken out of the respective vats and lightly washed with water. The plates after washing were visually determined for degree of staining. The results are also shown in Table 1.

EXAMPLE 2

The procedure of Example 1 was repeated except that 97 parts by weight of PMP and 3 parts by weight of PC were blended.

The results are shown in Table 1.

EXAMPLE 3

The procedure of Example 1 was repeated except that 85 parts by weight of PMP and 15 parts by weight of PC were blended.

The results are shown in Table 1.

Following examples are outside the scope of the present invention and illustrated herein for comparison purposes.

COMPARATIVE EXAMPLE 1

The procedure of Example 1 was repeated except that 100 parts by weight of PC was used and PMP was 0 part by weight.

The results are shown in Table 1.

COMPARATIVE EXAMPLE 2

The procedure of Example 1 was repeated except that 100 parts by weight of PMP was used and PC was 0 part by weight.

The results are shown in Table 1.

COMPARATIVE EXAMPLE 3

The procedure of Example 1 was repeated except that 99.9 parts by weight of PMP and 0.1 part by weight of PC were blended.

The results are shown in Table 1.

COMPARATIVE EXAMPLE 4

The procedure of Example 1 was repeated except that 65 parts by weight of PMP and 35 parts by weight of PC were blended.

The results are shown in Table 1.

COMPARATIVE EXAMPLE 5

The procedure of Example 1 was repeated except that 98 parts by weight of PMP and 2 parts by weight of a white pigment, titanium oxide were blended.

The results are shown in Table 1.

COMPARATIVE EXAMPLE 6

The procedure of Example 1 was repeated except that 95 parts by weight of PMP and 5 parts by weight of a white pigment, zinc sulfide were blended.

The results are shown in Table 1.

TABLE 1

|  | E1 | E2 | E3 | CE1 | CE2 |
|---|---|---|---|---|---|
| Composition, parts by weight | | | | | |
| (A) PMP | 95 | 97 | 85 | 0 | 100 |
| (B) PC | 5 | 3 | 15 | 100 | 0 |
| Properties | | | | | |
| Haze, % | 65 | 57 | 88 | 2.0 | 1.5 |
| Transmittance, % | 45 | 58 | 36 | 90 | 92 |
| Whiteness | 72 | 68 | 76 | UM* | UM* |
| Staining | | | | | |
| Ketchup | NO | NO | NO | Stained | NO |
| Curry sauce | NO | NO | NO | Stained | NO |
| Red pigmented ginger | NO | NO | NO | Stained | NO |
| Rice | NO | NO | NO | NO | NO |
| Miso soup | NO | NO | NO | NO | NO |
| Worcester sauce | NO | NO | NO | Stained | NO |

|  | CE3 | CE4 | CE5 | CE6 |
|---|---|---|---|---|
| Composition, parts by weight | | | | |
| (A) PMP | 99.9 | 65 | 98 | 95 |
| (B) PC | 0.1 | 35 | TiO2 2 | ZnS 5 |
| Properties | | | | |
| Haze, % | 6 | 89 | 90 | 86 |
| Transmittance, % | 85 | 35 | 32 | 36 |
| Whiteness | 43 | 78 | 74 | 73 |
| Staining | | | | |
| Ketchup | NO | Slight-stained | Stained | Stained |
| Curry sauce | NO | Slight-stained | Stained | Stained |
| Red pigmented ginger | NO | Stained | Stained | Stained |
| Rice | NO | NO | NO | NO |
| Miso soup | NO | NO | NO | NO |
| Worcester sauce | NO | Slight-stained | Stained | Stained |

*UM: unmeasurable because plates are transparent

EXAMPLE 4

The procedure of Example 1 was repeated except that the PC was replaced by a polyethylene terephthalate (PET) having a refractive index of 1.58 (trademark Mitsui PET J135, manufactured and sold by Mitsui PET Resin Co., Ltd.).

The results are shown in Table 2.

EXAMPLE 5

The procedure of Example 1 was repeated except that the PC was replaced by a polyether sulfone (PES) having a refractive index of 1.65 (trademark VICTREXPES 4100G, manufactured and sold by ICI Japan Co., Ltd.).

The results are shown in Table 2.

EXAMPLE 6

The procedure of Example 1 was repeated except that the PC was replaced by a polyamide resin (PA) having a refractive index of 1.54 (trademark Glyl-Amide TR55, manufactured and sold by Mitsubishi Chemical Industries, Ltd.).

The results are shown in Table 2.

EXAMPLE 7

The procedure of Example 1 was repeated except that the PC was replaced by a polypropylene resin (PP) having a refractive index of 1.49 (trademark Mitsui Polypro Hipole[R] F651, manufactured and sold by Mitsui Petrochemical Industries, Ltd.).

The results are shown in Table 2.

Following examples are outside the scope of the present invention and illustrated herein for comparison purposes.

COMPARATIVE EXAMPLES 7-9

The procedure of Example 1 was repeated except that instead of the PC, the PET in Example 4 was used in the amounts reported in Table 2.

The results are shown in Table 2.

TABLE 2

|  | Examples | | | | |
|---|---|---|---|---|---|
|  | E1 | E4 | E5 | E6 | E7 |
| Composition, parts by weight | | | | | |
| (A) PMP | 95 | 95 | 95 | 95 | 95 |
| (B) | PC | PET | PES | PA | PP |
|  | 5 | 5 | 5 | 5 | 5 |
| Properties | | | | | |
| Haze, % | 65 | 90 | 85 | 72 | 45 |
| Transmittance, % | 45 | 35 | 40 | 35 | 65 |
| Whiteness | 72 | 75 | 70 | 68 | 58 |
| Staining | | | | | |
| Ketchup | NO | NO | NO | NO | NO |
| Curry sauce | NO | NO | NO | NO | NO |
| Red pigmented ginger | NO | NO | NO | NO | NO |
| Rice | NO | NO | NO | NO | NO |
| Miso soup | NO | NO | NO | NO | NO |
| Worcester sauce | NO | NO | NO | NO | NO |

|  | Comparative Examples | | |
|---|---|---|---|
|  | CE7 | CE8 | CE9 |
| Composition, parts by weight | | | |
| (A) PMP | 0 | 99.9 | 65 |
| (B) | PET | PET | PET |
|  | 100 | 0.1 | 35 |
| Properties | | | |
| Haze, % | 0.6 | 8 | 94 |
| Transmittance, % | 91 | 87 | 30 |
| Whiteness | UM* | 45 | 83 |
| Staining | | | |
| Ketchup | Stained | NO | Stained |
| Curry sauce | Slight-stained | NO | Stained |
| Red pigmented ginger | Stained | NO | Stained |
| Rice | NO | NO | NO |
| Miso soup | NO | NO | NO |
| Worcester sauce | Slight-stained | NO | Stained |

*UM: unmeasurable because plates are transparent.

I claim:

1. A resin composition which is resistant to food stains consisting essentially of
   (A) 80 to 99.5% by weight of a polymer of 4-methyl-1-pentene and
   (B) 0.5 to 20% by weight of a thermoplastic resin having a refractive index between 1.48 and 1.80.

2. The composition of claim 1 wherein the polymer of 4-methyl-1-pentene is a homopolymer.

3. The composition of claim 1 wherein the polymer of 4-methyl-1-pentene is a copolymer comprising at least 85 mol% of 4-methyl-1-pentene and another α-olefin.

4. The composition of claim 1 wherein thermoplastic resin (B) is selected from the group consisting of a polyester, a polycarbonate, a polyether sulfone, a polyamide, and a polyolefin other than the poly(4-methyl-1-pentene).

5. The composition of claim 4 wherein thermoplastic resin (B) is a polycarbonate.

6. The composition of claim 5 wherein the polycarbonate is derived from bisphenol-A.

7. The composition of claim 1 wherein 90 to 98% by weight of polymer of 4-methyl-1-pentene (A) and 2 to 10% by weight of thermoplastic resin (B) are present.

8. An article molded from the composition of claim 1.

9. An article injection molded from the composition of claim 1.

10. An article molded from the composition of claim 5.

11. An article injection molded from the composition of claim 5.

12. A dish having improved resistance to food stains, wherein at least a surface portion to be in contact with food is formed of a resin composition consisting essentially of
    (A) 80 to 99.5% by weight of polymer of 4-methyl-1-pentene and
    (B) 0.5 to 20% by weight of a thermoplastic resin having a refractive index between 1.48 and 1.80, whereby the dish has a white surface.

13. The dish of claim 12 wherein thermoplastic resin (B) is selected from the group consisting of a polyester, a polycarbonate, a polyether sulfone, a polyamide, and a polyolefin other than the poly(4-methyl-1-pentene).

* * * * *